May 28, 1968 N. E. KLEIN ET AL 3,385,493
APPARATUS TO CONTROL THE SPEED OF A FABRIC HANDLING MACHINE
Original Filed March 2, 1964 10 Sheets-Sheet 2
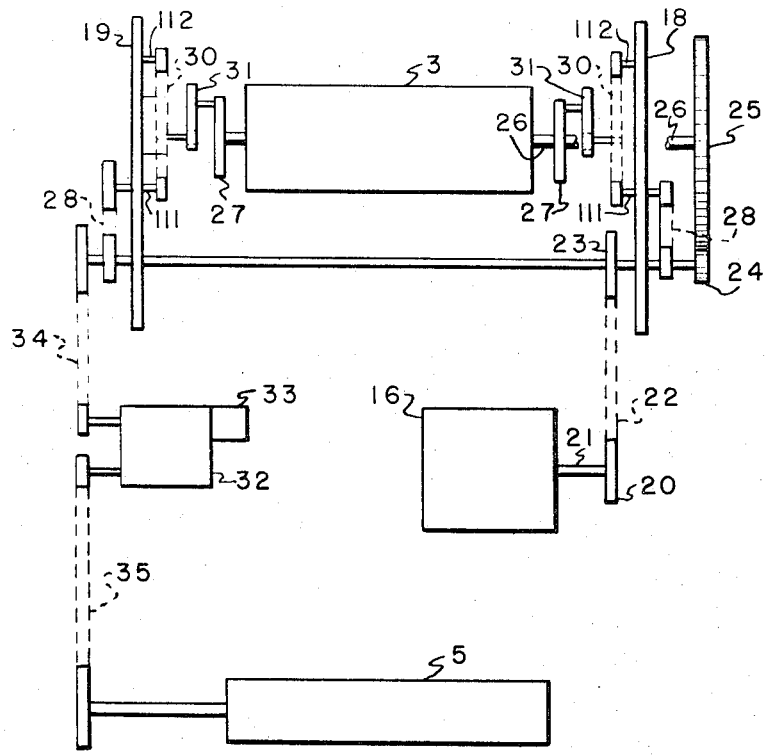
FIG.-2-
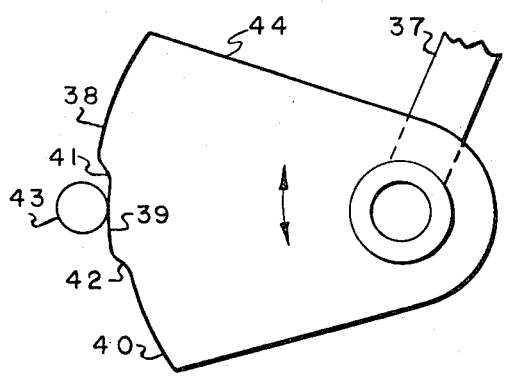
FIG.-3-
INVENTORS
NORMAN E. KLEIN
CHARLES A. WETHINGTON
BY
Earle R. Marden
ATTORNEY

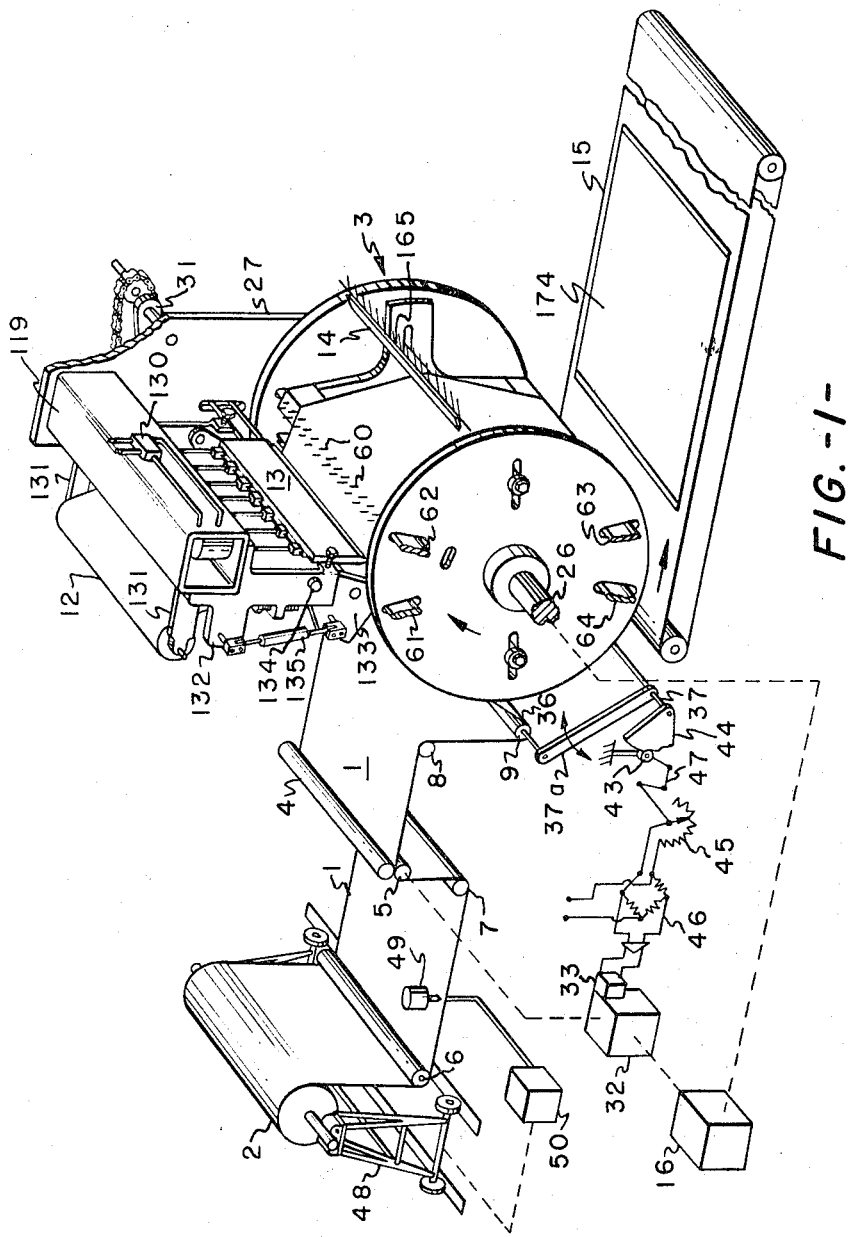

INVENTORS
NORMAN E. KLEIN
CHARLES A. WETHINGTON
BY

Earle R Marden
ATTORNEY

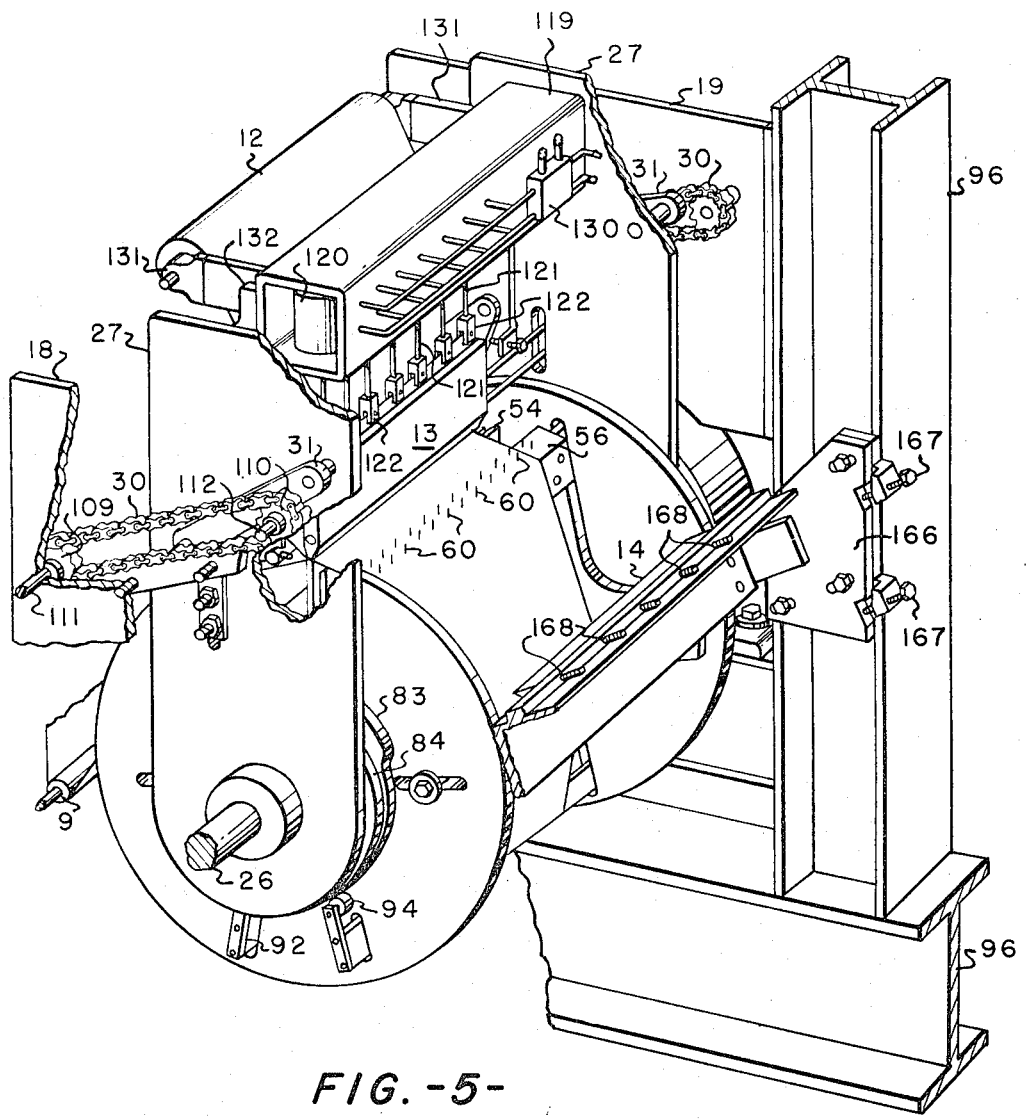
FIG.-5-

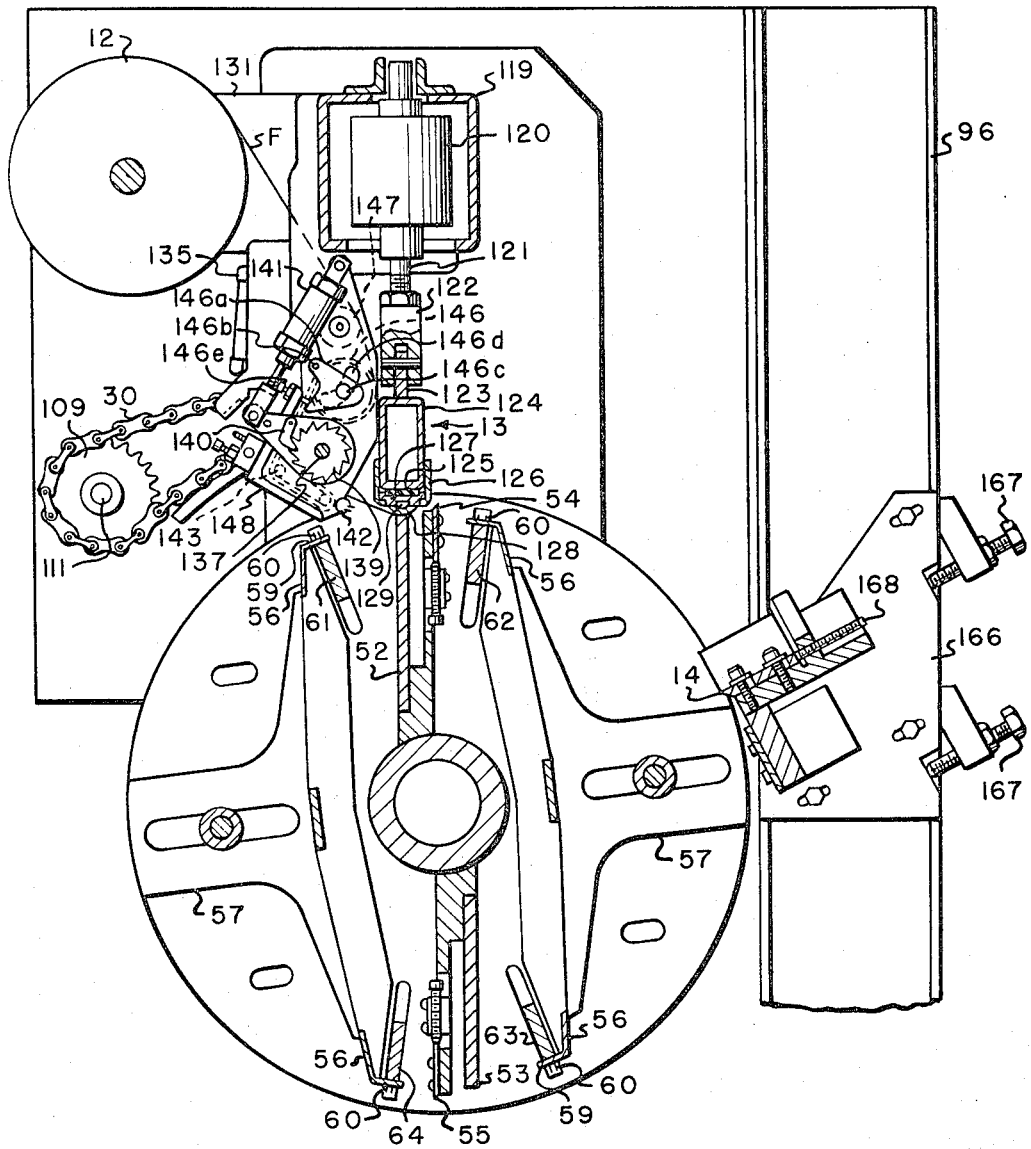
FIG.-6-

May 28, 1968 N. E. KLEIN ET AL 3,385,493
APPARATUS TO CONTROL THE SPEED OF A FABRIC HANDLING MACHINE
Original Filed March 2, 1964 10 Sheets-Sheet 6
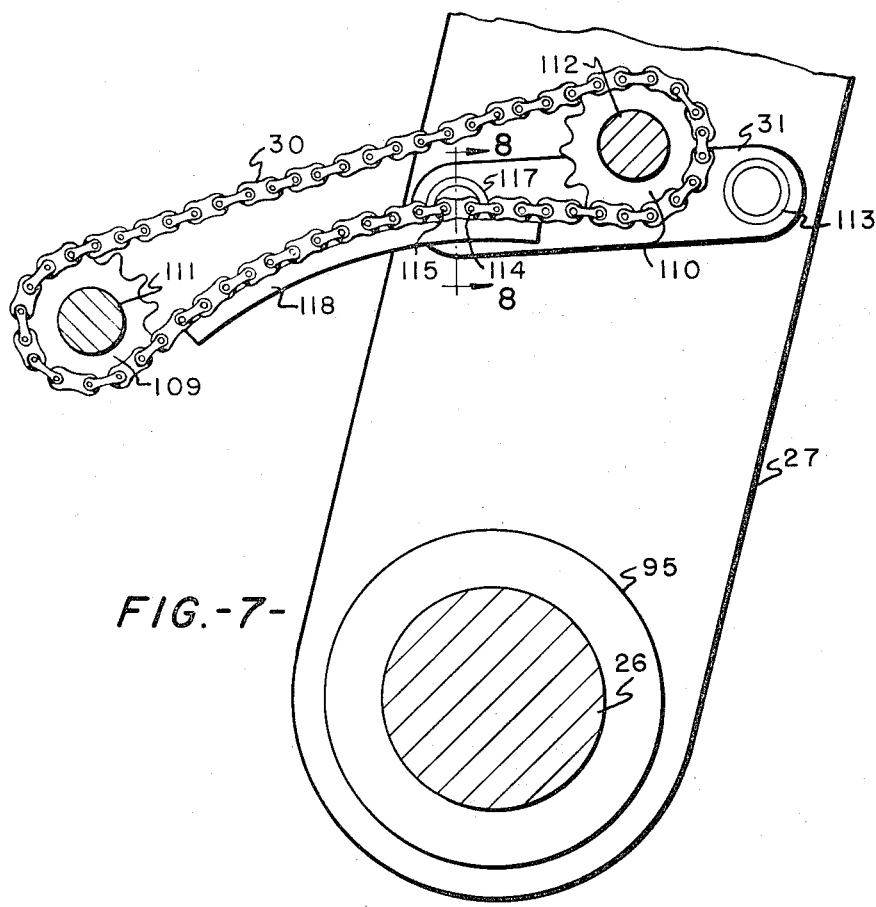
FIG.-7-
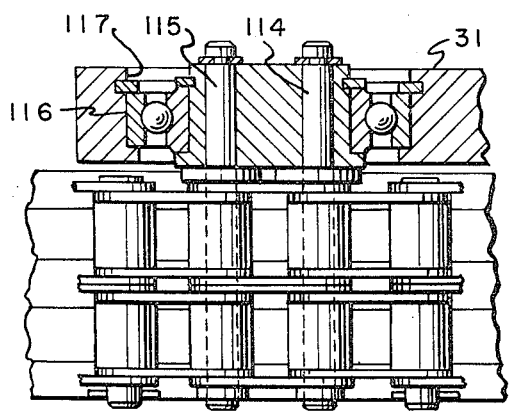
FIG.-8-
INVENTORS
NORMAN E. KLEIN
CHARLES A. WETHINGTON
BY
*Earle R. Marden*
ATTORNEY

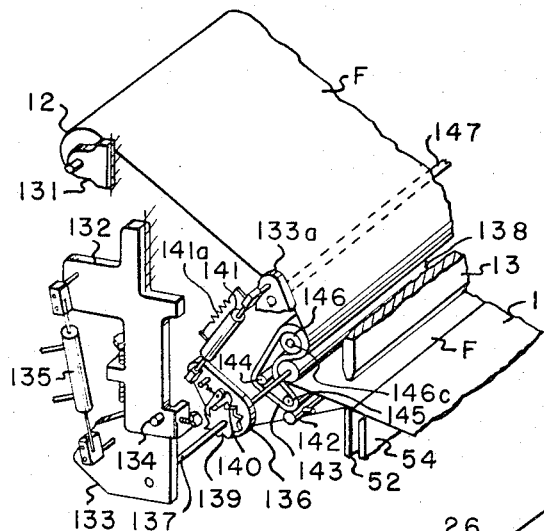
FIG.-9-
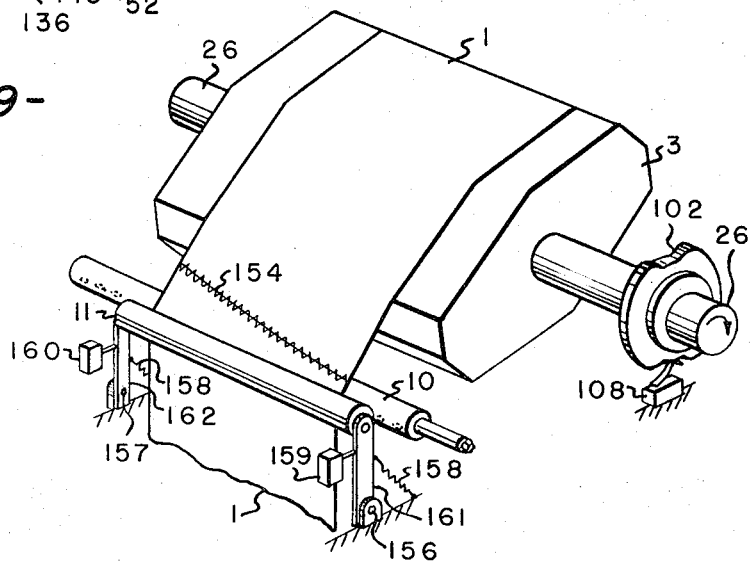
FIG.-10-
FIG.-11-
INVENTORS
NORMAN E. KLEIN
CHARLES A. WETHINGTON
BY
Earle R. Marden
ATTORNEY May 28, 1968     N. E. KLEIN ET AL     3,385,493
APPARATUS TO CONTROL THE SPEED OF A FABRIC HANDLING MACHINE
Original Filed March 2, 1964     10 Sheets-Sheet 8
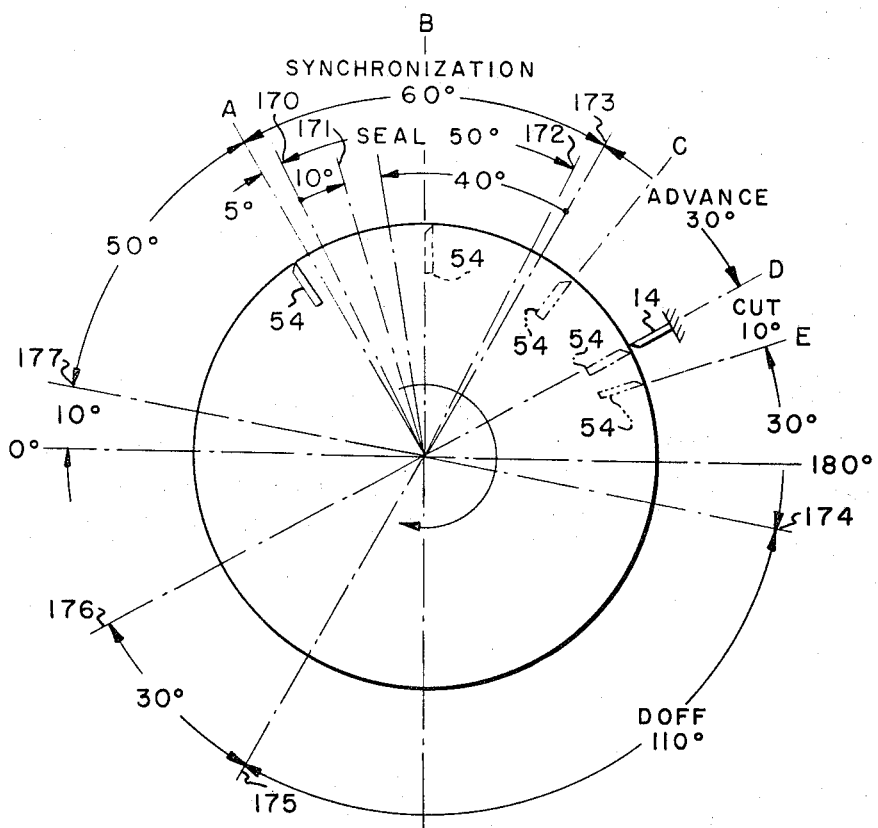
FIG.-12-
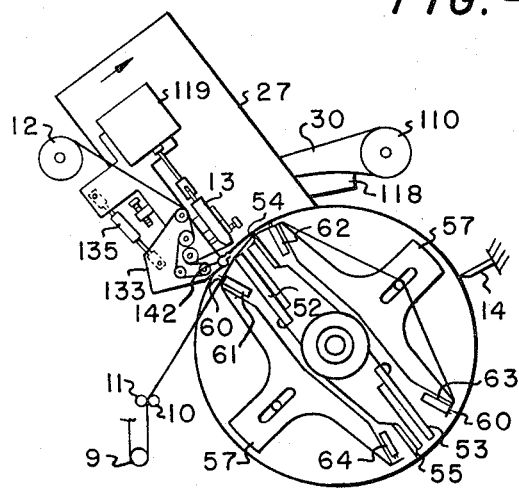
FIG.-13-
INVENTORS
NORMAN E. KLEIN
CHARLES A. WETHINGTON
BY
*Earle R. Marden*
ATTORNEY

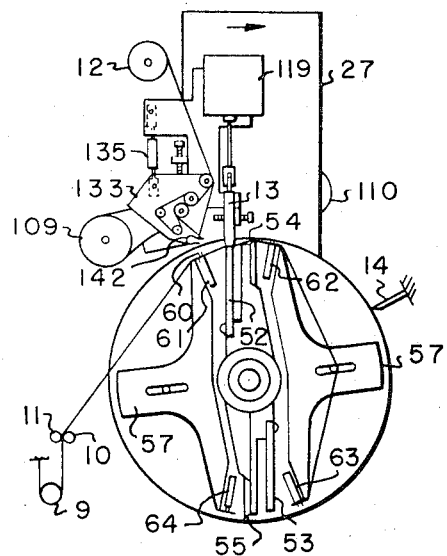
FIG.-14-
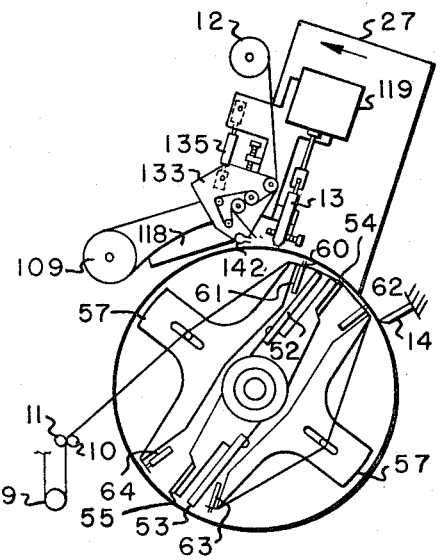
FIG.-15-
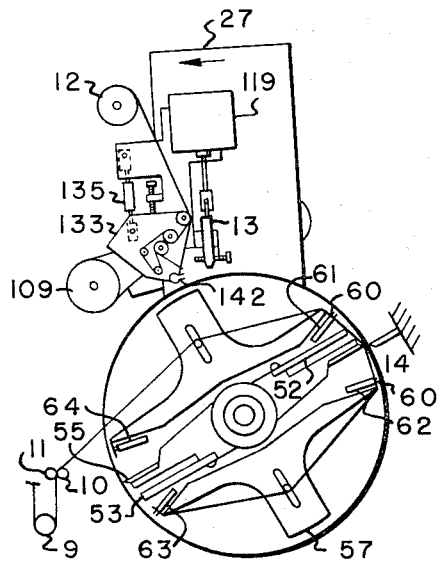
FIG.-16-
INVENTORS
NORMAN E. KLEIN
CHARLES A. WETHINGTON
BY
Earle R Marden
ATTORNEY

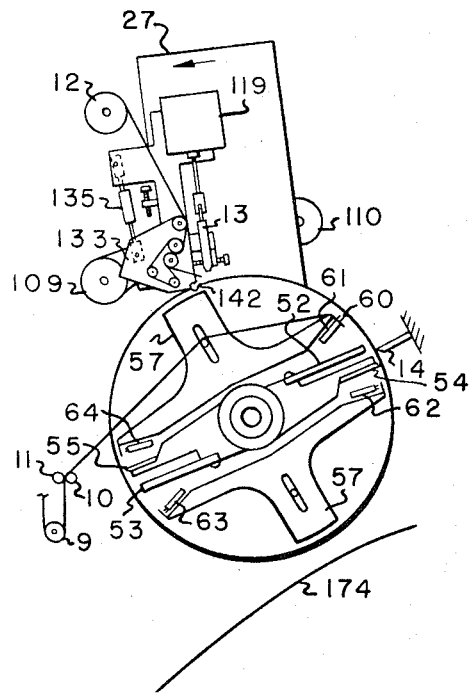
FIG.-17-
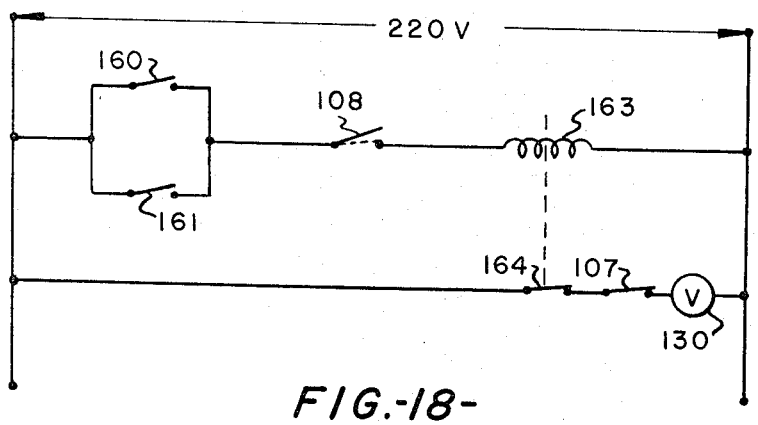
FIG.-18-
INVENTORS
NORMAN E. KLEIN
CHARLES A. WETHINGTON
BY
ATTORNEY United States Patent Office 3,385,493
Patented May 28, 1968

3,385,493
APPARATUS TO CONTROL THE SPEED OF A
FABRIC HANDLING MACHINE
Norman E. Klein, Inman, and Charles A. Wethington, Spartanburg, S.C., assignors to Deering Milliken Research Corporation, Spartanburg, S.C., a corporation of Delaware
Original application Mar. 2, 1964, Ser. No. 348,469. Divided and this application Feb. 9, 1967, Ser. No. 614,997
4 Claims. (Cl. 226—42)

ABSTRACT OF THE DISCLOSURE

Fabric handling machine which measures the depth of a loop in the fabric being supplied to the machine to speed up or slow down the machine depending on the depth of the loop.

Figure 4:
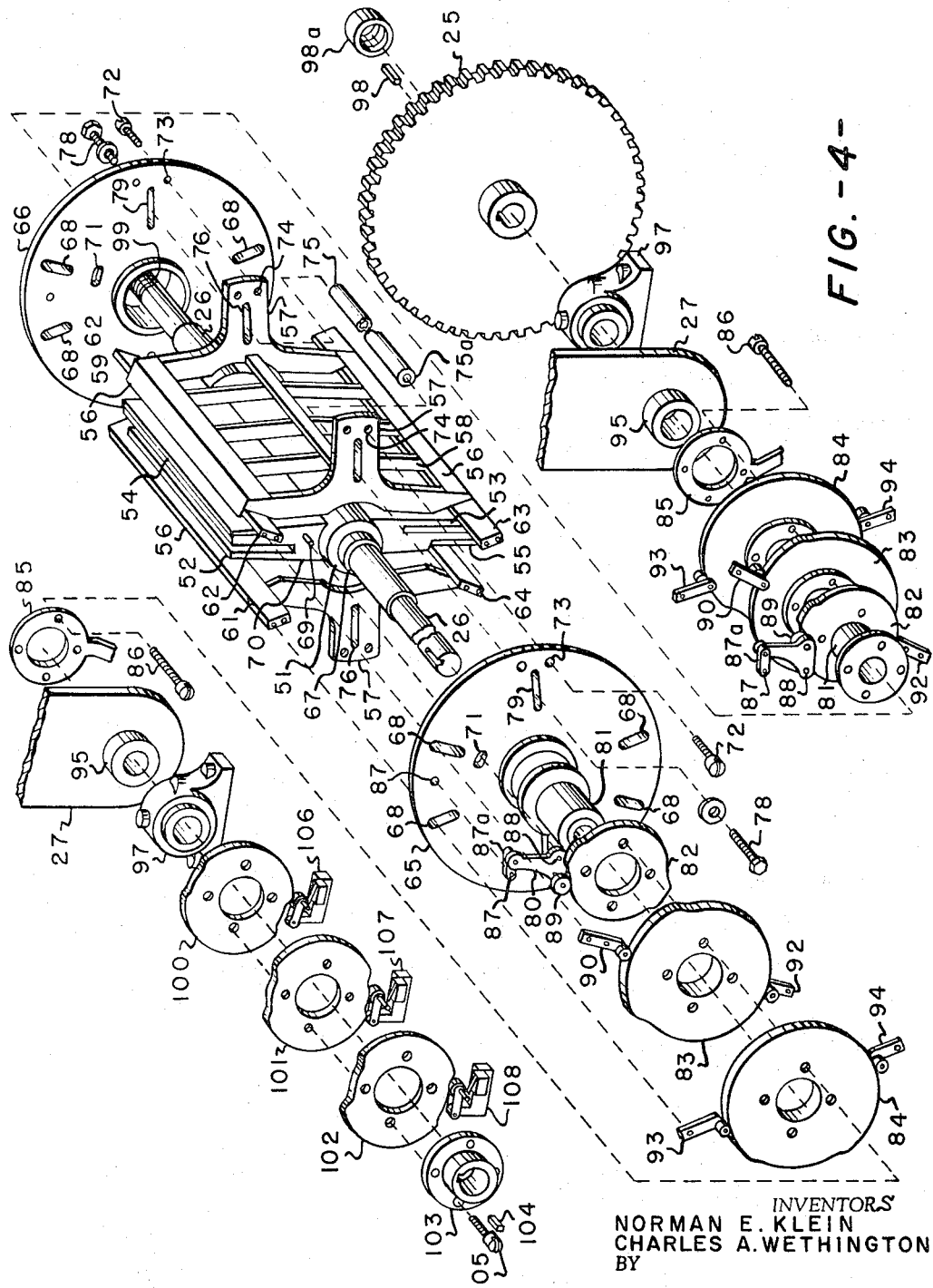

A loop is formed in a fabric being supplied to a fabric handling machine. Located and supported in the loop is a dancer roll which moves up and down as the depth of the loop varies in response to the take-up of the fabric handling machine. The dancer roll through suitable linkage varies the speed of the fabric feed rolls in response to the positions of the dancer roll to maintain a substantially constant feed of fabric to the fabric handling machine.

This application is a division of co-pending application Serial No. 348,469, filed March 2, 1964.

This application relates generally to apparatus for handling web material and more specifically to a fabric handling machine which controls the feed of fabric thereto to provide a substantially constant supply of fabric.

Prior to this invention fabric handling machines have been supplied fabric by a constant speed set of feed rolls which take fabric from a large roll and supply such fabric at a constant rate to the fabric handling machine. This presents problems since the fabric handling machine takes the fabric at varied rates due to the peculiarities of each, thereby varying the rate of take-up by the machine causing differences in the tension of the fabric being supplied by the feed rolls.

An object of the invention is to provide apparatus to seal and cut textile materials which control the speed of the textile material being supplied in direct response to the speed of the take-up of such material.

A second object of the invention is to provide an efficient and high production diaper machine which evenly and continuously seals and cuts diapers with a thermoplastic type selvage.

Other objects and advantages will become clearly apparent as the specification proceeds to describe the invention with reference to the accompanying drawings in which:

FIGURE 1 is a schematic drawing of the overall arrangement;
FIGURE 2 is a schematic arrangement of the drive system for the machine shown in FIGURE 1;
FIGURE 3 is a blown up view of the feed roll control cam shown in FIGURE 2;
FIGURE 4 is an exploded perspective view of the rotor cage member;
FIGURE 5 is a perspective end view of the machine shown in FIGURE 1 with parts broken away to show details of the invention;
FIGURE 6 is a sectional view taken through the upper platen and the rotor-cage assembly to show details of the upper platen and the rotor-cage assembly;
FIGURE 7 is a blown up view of the timing chain arrangement shown in FIGURE 5 employed to synchronize the reciprocating movement of the upper platen with the rotating movement of the rotor-cage assembly;
FIGURE 8 is a top view of the chain and crank arm shown in FIGURE 6 to illustrate the connection of the timing chain to the crank arm;
FIGURE 9 is a perspective schematic view of the film feeding mechanism;
FIGURE 10 is a perspective view of the seam detection apparatus;
FIGURE 11 is a top view of the fixed cutting blade shown in FIGURE 5;
FIGURE 12 is a graphical representation of the operation of the rotor-cage assembly and the upper platen;
FIGURES 13–17 are schematic representations of the movement of the upper platen and the rotor-cage assembly to provide a sealed edge strip of textile material; and
FIGURE 18 is a partial circuit diagram of the herein disclosed textile machine.

In the preferred form of the invention sealed edge diapers are being produced continuously from a roll of material. Preferably a polyvinyl chloride film approximately ¼" in breadth is heat sealed across the whole width of the diaper cloth. The sealed portion of the diaper material is then cut in the center to provide a diaper with approximately a ⅛" thermoplastic selvage on each end to prevent unraveling. With the herein disclosed method and apparatus a production rate of 24–34 diapers a minute is obtainable versus much slower rates with a machine employing a liquid sealant. As pointed out above it is preferred to manufacture diapers with a polyvinyl chloride seal, hereafter referred to as a PVC seal, but obviously other similar products such as handkerchiefs, etc., can be made employing the same apparatus and methods. Also it is within the scope of the invention to employ other suitable film material to create a thermoplastic type selvage on the ends of the material being produced.

Looking now to FIGURES 1 and 2 there is illustrated schematically the general arrangement of the preferred form of the diaper machine. Diaper material 1 from a roll of material 2 is delivered to the rotating rotor-cage assembly 3 by top and bottom feed rolls 4 and 5. Successively the diaper material 1 from the roll 2 passes under the guide rolls 6 and 7, between the feed rolls 4 and 5, over another guide roll 8, under the dancer roll 9, between the seam detector rolls 10 and 11 (shown in FIGURE 10), and onto the rotor-cage assembly 3. Thermoplastic type film material, such as polyvinyl chloride (PVC), is then supplied from a supply roll 12 to a position between the diaper material 1 and the upper platen member 13 where it is heat set into the diaper material by the heated upper platen 13. The rotating rotor-cage assembly rotating in the clockwise direction indicated by an arrow brings the sealed portion of the diaper material to a position where the diaper material 1 is severed in the middle of the seal by the fixed knife blade 14. After passing the blade 14 the severed diaper 174 will fall onto a conveyor 15 where it is conveyed to a position, not shown, for folding and packaging.

A main drive motor 16 is provided to drive both the rotor-cage assembly 3 and the cloth nip roll 5. To drive both the rotor-cage assembly 3 and the cloth nip roll 5, the main drive motor is operably connected to the countershaft 17, suitably supported in the side plates 18 and 19 of the frame 96 of the diaper machine, by a sheave member 20 fixed to the drive motor shaft 21, a belt 22 of suitable construction, and another sheave 23 fixed to the countershaft 17.

From the countershaft the rotor-cage assembly 3 is continuously rotatably driven from the countershaft 17 through gears 24 and 25 and the rotor shaft 26.

Swing arm or upper platen and film support members 27, freely mounted on the rotor shaft 26, are reciprocably driven from the countershaft 17 through chain members 28, stub shafts 111, timing chains 30, and crank arms 31 pinned to the swing arms 27.

The cloth feed roll 5 is also driven by the main drive 16 through the countershaft 17. Interspaced between the countershaft and the cloth feed roll 5 is a speed variator 32 controlled preferably by a servo motor 33, schematically shown in FIGURES 1 and 2. The speed variator 32 is connected to the countershaft 17 by a timing belt 34 and is connected to the cloth feed roll by a chain member 35. The proper speed of the feed roll is selected to coordinate with the speed of take-up by the rotor-cage assembly. This pre-selected speed of the feed roll 5 is obtained by adjusting the servo motor to provide the proper output speed of the chain member 35. The servo motor 33 and the speed variator can be of many commercially available types.

To maintain the pre-selected speed ratio between the cloth take-up by the rotor-cage assembly 3 and the cloth delivered by the feed roll 5, a dancer roll 9 is provided which is riding in the loop portion 36 of the diaper material between the guide roll 8 and the seam detector rolls 10 and 11 (shown in FIGURE 10). Dancer roll 9 is rigidly secured to a pivotally mounted rod member 37 through a support arm 37a, suitably supported below the slack loop 36. Mounted on one end of the rod member 37 is a cam member 44, shown enlarged in FIGURE 3, which pivots with the rod member 37. Preferably, the cam member is designed to have surfaces 38, 39 and 40 with a constant radius to provide dwell portions. Surfaces 41 and 42 provide the hereinafter described camming action.

In normal operation when the cloth feed is properly synchronized with the takeup of the rotor-cage assembly 3, the slack loop 36 will assume a position which will position the dancer roll 9 so that the cam follower 43 will ride on the dwell 39. The length of dwell 39 is so selected that minor variations in the cloth speed will cause the cam to rotate back and forth but the cam follower 43 will not cause any change in the setting of the potentiometer 45 since the dwell surface 39 is of a constant radius of curvature. The dwell surface 39 is designed to allow these small variations without affecting the cloth feed because the servo motor 33 will overheat if it is in constant use due to minor variations in cloth feed.

Assume now that the take-up of cloth by the rotor-cage assembly 3 exceeds the amount of cloth being delivered by the feed roll 5, the slack loop will then shorten causing the dancer roll 9 to be raised causing the rod member 37 and the cam member 44 to rotate clockwise. If the feed variation is large enough the cam member 44 will be rotated to a position where the cam follower will ride up the cam surface 41 causing a change in the potentiometer 45 which will unbalance the bridge circuit 46. Unbalance of the bridge circuit 46 will cause the servo motor 33 to adjust the speed variator 32 to increase the speed of the feed roll 5.

Conversely, if the cloth feed greatly exceeds the take-up by the rotor-cage assembly the slack loop 36 will lengthen allowing the dancer roll to be lowered causing the rod member 37 and the cam member 44 to be rotated counterclockwise allowing the cam follower 43 to ride down the cam surface 42. Movement of the cam follower down the cam surface 42, through the schematically shown linkage 47, causes the potentiometer setting to be varied in the direction opposite to that when the feed roll 5 is underfeeding. Again the bridge circuit becomes unbalanced causing the servo motor 33 to adjust the speed variation to slow down the delivery speed of the feed roll 5.

The above-described speed control automatically maintains the approximate pre-selected speed ratio between the feed roll 5 and the rotor-cage assembly 3. As pointed out above, the cam member 44 is so designed to allow minor variations in the feed ratio without adjustment of the servo motor 33 in order to protect the servo motor employed to control the adjustment of the speed variator 33.

As an alternate to the use of the bridge circuit 46 and the servo motor 33, the potentiometer 45 can furnish a proportional command signal to a solid state amplifier which in turn would control the speed variator 32, which in this type of arrangement would be a variable speed D.C. motor. The same cam, follower, and potentiometer arrangement would be employed to furnish the signal to the solid state amplifier.

To properly position the cloth material with respect to the rotor-cage assembly a conventional edge guide detector is employed to move the dolly 48 which supports the cloth roll 2. Briefly, the sensing element 49 is positioned to automatically sense the edge of the cloth material 1. If the edge of the material is not properly positioned a signal will be relayed to the control member 50 to move the dolly in one direction or the other. In the preferred form of the invention, the system employed is pneumatic and the dolly is moved back and forth by a pneumatic piston. Such system is conventional and per se is not part of the herein disclosed invention.

Looking now to FIGURE 4 the rotor-cage assembly 3 and associated cam members are shown in an exploded view for the sake of illustration. Also for the purposes of illustration the drive gear 25 is shown on the opposite end of the shaft 26 when compared with FIGURE 2. It is within the scope of the invention to drive the shaft 26 from either end.

Rigidly secured to the shaft 26 is a central shaft 51. Rigidly secured to the central shaft 51 is a pair of platens 52 and 53 spaced 180° from each other. Spaced closely adjacent to the platens 52 and 53 are blade members 54 and 55 which are also rigidly secured to the central shaft 51. The platens 52 and 53 are spaced approximately one inch from the cutting edge of the respective blade 54 or 55 with the top of the platen on a smaller radius than the blade.

Faced away from and on each side of the platens 52, 53 and the blades 54, 55 are angle members 56, preferably of stainless steel. Each pair of angles supported on one side of the shaft 51 are secured in spaced relation by end supports 57 with strut supports 58 therebetween to provide rigidity and to maintain proper spacing. The outer surface 59 of each angle member has holes therein through which pins 60 mounted in pin bars 61, 62, 63 and 64 can move therethrough for reasons hereinafter explained. Disc members 65 and 66 secure the angles 56 together as a composite structure which not only rotates generally with the main shaft 26 but is rotatable relative to the platens 52, 53 and the blades 54, 55.

Discs 65 and 66 are mounted on bearings 67 on the shaft 26 with the pin bars 61, 62, 63 and 64 projecting through the elongated openings 68 in the discs. Pin members 69 on both ends of the blade and platen member 70 project through the elongated openings 71 in the discs 65 and 66 and are secured to a bell crank 80. Elongated openings 71 are large enough that the discs with attached angles can move relative to the platen and blade member 70 to the extent dictated by cam 82 bearing against follower 89 and moving bell crank 80.

The discs 65, 66 and the angles 56 are secured together as a composite structure by suitable means such as screws 72 which pass through opening 73 in the discs 65 and 66 and screw into openings 74 in the angle end supports 57. Further, a tapped tubular member 75 is provided for each pair of end supports 57 and is placed in registry with the elongated slots 76 in the end supports 57. Suitable means, such as screw members 78, can then be inserted through the elongated openings 79 in the discs 65 and 66, through the elongated slots 76 in the end supports 57, and screwed into the tapped or threaded opening 75a in the tubular member 75 to provide a rigid construction. Elongated openings 79 and elongated slots 76 allow the adjustment of the tubular member 75 inward or outward to provide a particular length of fabric path between blades 54 and 55 via angles 56.

Outboard of both discs 65 and 66 on the shaft 26 is a bearing-sleeve member 81 on which is mounted advance and retard cams 82, pin load and unload cams 83, pin and unload cams 84, and cam stabilization mount 85 which is fixed to the frame of the diaper machine and therefore does not rotate with the shaft 26. Cams 82, 83 and 84 do not rotate with the shaft 26 since they are secured to the cam stabilization mount by any suitable means such as screw member 86. There are two identical assemblies consisting of cams and cam stabilization mount with bearings, one on the outer side of each disc 65 and 66, to perform synchronously identical functions.

Bell crank 80 mounted at one point 87 via link 87a to the discs 65 and 66 and mounted at another bearing position 88 on pin member 69 on the blade and platen member 70 has a follower 89 connected thereto and in operative relation to the fixed advance and retard cam 82 to cause rotation of the disc and angles relative to the blade and platen member 70 at pre-determined intervals.

Cam followers 90 and 92 in operative relationship with pin load and unload cams 83 are connected, respectively, to pin bars 62 and 64 to control the radial position of the pins 60 in these respective pin bars. Cam followers 93 and 94 in operative relationship with pin load and unload cams 84 are connected, respectively, to pin bars 61 and 63 to control the radial position of the pins 60 on these respective pin bars.

Mounted on bearings 95 on both ends of shaft 26 outboard of the cam stabilization mounts 85 are swing arm or upper platen and film support members 27, which members 27 are free to rotate in respect to shaft 26. Outboard of the swing arms 27 and mounted on frame 96 of the diaper machine are the main bearings 97 for the support of rotating shaft 26.

As pointed out above, on one end of the shaft the drive gear 25 is locked by key member 98 to the shaft 26 for the purpose heretofore set forth. A screw cam member 98a is provided for this shaft to maintain the gear 25 in proper position and is screwed onto threaded end portion 99 of shaft 26.

Rigidly secured thereto and rotating therewith on the other end of the shaft 26 is film feed cam 100, seal pressure cam 101, and seam detect cam 102. A retaining collar member 103 is secured by key member 104 to the shaft 26 to retain the cams 100, 101 and 102 in fixed phase relation to shaft 26 and equipment fixed thereon. The cams 100, 101 and 102 are connected to the collar member 103 by suitable means such as screw member 105. Switch members 106, 107 and 108 are mounted in operative relationship respectively with cams 100, 101 and 102 for reasons set forth hereinafter.

As discussed briefly the swing arms 27 support the film feed assembly, shown in detail in FIGURE 9, and the upper platen assembly 13. The film feed assembly supplies the thermoplastic film between the diaper and the upper platen at pre-determined intervals. Then the upper platen member is actuated to heat seal the thermoplastic material to the diaper material prior to severance. It is therefore imperative that oscillating motion of the swing arms be synchronized with the rotary motion of the rotor-cage assembly 3 during a portion of the angle of rotation of the rotor-cage assembly to insure a proper seal.

As previously pointed out the swing arms 27 are driven by a chain member 30 which is operably associated with the countershaft 17. The chain members 30 are operably connected to sprockets 109 and 110 which are rotatably carried by stub shafts 111 and 112 supported in end plates 18 and 19. Looking at FIGURES 7 and 8 the crank arms 31 are pivotably secured to the swing arms 27 at 113. The other end of the crank arm 31 is secured to the chain member 30 by means of extended pin members 114 and 115 which replace two standard link pins of the chain 30. Pin members 114 and 115 are connected to a bearing member 116 secured within the opening 117 in the crank arm 31. During a portion of the travel of the chain 30 the chain 30 slides on a curved slide plate 118 to synchronize the angular velocity of the swing arm 27 with the angular velocity of the rotor-cage assembly 3.

In the illustrated diaper machine the swing arms 27 carrying the upper platen assembly 13 and the film feed assembly are geared to make two complete cycles to one complete rotation of the rotor-cage assembly 3 in order to make two diapers for each complete rotation of the rotor-cage assembly. Other ratios higher than two to one can be used but the radian angle length of the useful work cycle (length of arc upper platen assembly 13 is in exact synchronism with lower platen 52 or 53) becomes shorter. The desired two to one ratio or other ratios, if desired, requires that the length of chain 30 along its pitch line must be exactly equal to the circumference of a circle drawn through the chain pitch line above arc member 118 and centering on the center of shaft 26 divided by the desired ratio which in the preferred embodiment is 2. The selected circle, as pointed out, must center on the shaft 26 since the rotor-cage assembly 3 also rotates on this center and the theoretical angular velocity of any point on the selected circumference will be the same for the rotor-cage assembly as for the swing arm assembly. In the case of the preferred two to one ratio, the work cycle length will tend to approach 90° as sprockets 109 and 110 are diminished in size. However, under practical size consideration a work cycle length of approximately 60 is easily achieved. The turn ratio between the power input drive to the chain, in this case through sprocket 109 has to then satisfy the speed requirement of the chain at both the pitch line of input sprocket 109 and that generated by the pitch line circle whose radius is equal to that from the center of shaft 26 to the center of the chain in contact with arc member.

Then, since the angular velocity of the swing arm 27 and the angular velocity of the rotor-cage assembly 3 must be perfectly synchronized for a pre-selected angle of movement in order to have time to complete the thermoplastic seal on the diaper material the radius of curvature of the top of the slide plate 118 is equal to the radius of curvature used to obtain the above pre-selected circumference less the distance between the bottom of the chain links which slide on the chute and the pitch line of the chain.

Located between and connected to swing arms 27 is a hollow rectangular support member 119. Located within the support member 119 is a plurality of pneumatic piston members 120 located across the width of the upper platen member 13. Descending from each of the piston members 120 is a rod member 121 screwed into a U-shaped bracket 122 which is pinned to flange member 123 welded or otherwise secured to the upper platen member 13. The upper platen member 13 supported below the piston members 120 consists of an elongated hollow tubular member 124, a strip of rubber 125 about a quarter of an inch thick which runs the width of the rectangular tubing member 124 to act as a pressure distributing element, the upper platen, and a pair of L-shaped elongated brackets 126 welded or otherwise secured to the hollow tubular member to secure the upper platen in position. The upper platen consists of two strips of metal 127 and 128 between which a Calrod electric resistance heater 129 is embedded.

As shown in FIGURES 1 and 5 a solenoid actuated four way pneumatic valve 130 is mounted on the rectangular tubular member 119 to supply pneumatic pressure simultaneously to all of the pistons 120 when the seal pressure cam 101 actuates seal pressure cam switch 107 to actuate the solenoid operated valve 130 in order to place the lower plate 129 of the upper platen in sealing relationship with the lower platen, as shown in FIGURE 6. Preferably the lower platen is wider than the upper platen to allow for any slight misalignment of the platens as they are brought together to seal the thermoplastic material to the diaper material.

Looking now in particular to FIGURES 6 and 9 the PVC film feed assembly is shown in detail. The film feed assembly is mounted on the rectangular tubular member 119 and therefore oscillates with the swing arms 27. At the same time the film feed asembly has a portion thereof which is movable with respect to the oscillating swing arms to feed film to a position on the diaper material between the upper and lower platens. The PVC film roll 12 is rotatably secured in a pair of suitable supports 131 connected to the rectangular tubular member 119. The film feed assembly is supported by a bracket member 132 one of which is connected on each end of the rectangular tubular member 119. Pivotally connected to each bracket member 132 is a plate member 133 pivoted at 134. Connecting the respective bracket members 132 and plate members is a double acting pneumatic piston member 135 which is actuated from a signal from the film feed cam 100 and the film feed cam switch 106 which energizes and de-energizes a four way valve (not shown) which controls the air pressure to the pneumatic piston member 135.

For the purpose of illustration in FIGURE 9 the support plate 136 freely mounted on the shaft 137 for the film feed roll 138, the ratchet member 139 rigidly mounted on shaft 137, the spring loaded pawl 140, the single acting pneumatic piston 141, and the bracket piece 133a are moved away from the plate member 133. Bracket piece 133a actually is the top of plate 133, which in FIGURE 9 would be hidden by the support member 132. Piston member 141 receives air from the pneumatic source, not shown, at the same time that the top of piston member 135 receives air from the pneumatic source, not shown. Piston member 141 will act downward against the bias of compression spring 141a to rotate plate 136 counterclockwise to force pawl 140 to engage one of notches of the ratchet 139 to rotate shaft 137 and feed roll 138 in order to advance approximately one-quarter inch of the film material F prior to insertion of such material by air jets 142 between the upper platen 13 and the lower platen 52 on top of the diaper material 1 prior to sealing. Aprons 143 extending across the width of the material being sealed are guided by rolls 144, 145 and 146 supported in the plate member 133 provided to assist in guiding and tensioning the PVC film material F. Looking at FIGURE 6 the roll 146 is supported in a pivotable member 146a which is pivotally secured to the inside of plate 133 at point 146b. The shaft 146c of the roll 146 is carried in the elongated groove 146d and can be moved therein by set screw arrangement 146e to vary the tension of the PVC film F. Roll 146 is supported at both ends of tubular member 119 in this fashion.

Roll member 147 guiding the PVC film F and angle iron member 148 extend between the brackets 133 to provide rigidity and strength to the film feed assembly.

It should be pointed out that when air is applied to the top of piston 135 that the plate 133 with all the members connected is swung counterclockwise by the piston 135 to place the film feeding mechanism adjacent the platens. As pointed out above, air is also applied to piston 141 to advance the film F. When the air is taken off the top of pistons 135 and 141, the air will be applied to the bottom of piston 135 to rotate the plate 133 clockwise but the piston 141 is returned upward by the bias of compression spring 141a to move the pawl 140 up to the next notch on the ratchet, ready for advancing the film feed when required. In other words, the pawl and ratchet are new cocked, ready for movement by the piston 141 again.

Looking now to FIGURES 10 and 18 the seam detector system will be described. As previously pointed out the seam detector rolls 10 and 11 are located between the dancer roll 9 and the rotor-cage assembly 3. Roll 10 is an idler roll and roll 11 is a feeler roll pivotally mounted at 156 and 157. Springs 158 can be employed to bias the feeler roll 11 toward the idler roll 10. A pair of micro-switches 159 and 160 are located adjacent the feeler roll support arms 161 and 162 respectively and electrically are connected in parallel so that one or the other or both can actuate the seam detector circuit.

In normal operation both of the micro-switches 160 and 161 will be open, switch 108 can be opened or closed, and time delay coil 163 will be de-energized. Time delay switch 164 operated by time delay coil 163 normally will be closed allowing seal pressure switch 107 to actuate and deactuate solenoid valve 130 which supplies pneumatic pressure to the upper platen piston 120.

The seam detector system is designed to prevent the upper platen from being actuated to the seal position if the cloth being processed has a seam 154 or other area of unusual thickness therein which may damage the platens if the platens are brought together on the fault. When an area of cloth of unusual thickness passes through the rolls 10 and 11 the feeler roll 11 will move away from the idler roll 10 against the bias of the springs 158 and close one or both of the micro-switches 159 and 160. Assuming that seam detect switch 108 is closed by seam detector cam 102 the time delay coil 163 will be energized thereby opening time delay switch 164 thereby de-energizing the circuit to the seal pressure switch 107 and the pneumatic solenoid operated four way valve 130. It is then impossible to supply pneumatic pressure to the pistons 120, assuming that seam detector cam switch 108 is closed, and bring the upper platen down into sealing position.

The timed interval of the time delay switch 164 is sufficient to hold the platen piston circuit open until the upper platen is on the return stroke but is not so long as to interfere with the operation of the next cycle.

Seam detector cam switch 102 is so designed that seam detector cam switch 108 is closed only when it is possible for a seam or a fault to lie in an area of the cloth where it might be contacted by the platens during the sealing operation. Upon sensing a seam or fault which will not be contacted by the platens, closing of either switch 160 or 161 will not energize the time delay switch coil under these conditions because seam detect cam switch 108 will be open.

As previously described the diaper material 1, after the PVC film has been sealed thereto, is severed at the center of the sealed strip area which will provide two selvages with a thermoplastic seal thereon to prevent unraveling of the material. To properly sever the diaper material the fixed blade member 14 is mounted adjacent the rotor-cage assembly 3 to cooperate with blades 54 and 55. As will be described hereinafter the sealed strip area on the diaper material is advanced clockwise from the lower platen 52 or 53 to a position where the knife blade 54 or 55 is at the center of the sealed area. The rotor-cage assembly 3 is then rotated to a position where blade 14 and blade 54 or 55 co-act to sever the material along the whole center length of the sealed area. After severing, the material below the knife blade 14 is released onto the conveyor 15 as a diaper with both edges sealed with a PVC film to prevent unraveling. A jet of air can be employed to aid in removing the diaper from the rotor-cage assembly 3.

To gain proper diaper material severing action the blade member 14 is supported in the machine frame 96 by a pair of support members 166, one of which is shown in FIGURE 5, at an angle to achieve a progressive or "scissor" type of cutting action. The angle of this fixed blade is set approximately 2 to 3 degrees in relation to the axis of rotation of the rotor-cage assembly 3 and the blades 54 and 55. Adjusting screws 167 are provided to generally position the blade adjacent the rotor-cage assembly 3 and final adjusting screws 168 are provided along the whole length of the blade to provide the final adjustment of the blade.

Blades 54 and 55 must be parallel to the axis of rotation of the rotor-cage assembly 3 in order to provide a cut at right angles to the fabric selvage. This cut must be at right angles in order to provide a square or rectangular shaped diaper with the sealed strip area on both of the severed ends the same width. Therefore, since it is preferred to have a shearing or scissor action on the material being cut the blade 14 is mounted at an angle of 2° to 3° to the axis of rotation of the rotor-cage assembly 3 to cooperate with the blades 54 and 55 which are parallel to the rotational axis. The blade member 14 can be slanted either right to left or left to right within the scope of the invention. In our preferred embodiment, FIGURES 5 and 6, the blade member 14 is slanted down right to left.

In this type of blade arrangement it is necessary to employ a cutting edge 169 on the blade 14 which has a curve which is equivalent to the perigee portion of an elliptical generatrix in order to properly mate with a straight movable blade describing a cylindrical generatrix. It can readily be seen that the elliptical shape of the blade is the only proper blade shape when you keep in mind that when you cut a cylinder at an angle not parallel to the axis that you obtain an elliptical surface. Therefore, since it is preferred to cut the diaper material 1 at an angle to the axis of rotation of the substantially cylindrically shaped rotor-cage assembly 3 to obtain the best shearing action on the diaper material, the cutting edge 169 of the blade 14 is elliptically shaped to conform to the theoretical elliptical path of the sequential cutting lines of the cloth as it is being sheared by the blades 14 and 54 or 55.

OPERATION

Looking now in detail to FIGURES 12–17, the operation of the herein disclosed textile machine will be described. The reference letters A–E in FIGURE 12 represent, respectively, the positions of the apparatus shown in FIGURES 13–17. It should be kept in mind that the oscillating swing arm 27 and the apparatus attached thereto goes through two cycles for every complete rotation of the rotor-cage assembly 3 in order to make two diapers for each complete rotation of the rotor-cage assembly.

In the position indicated at A the angular velocity of the swing arms 27 is synchronized with the angular velocity of the rotor-cage assembly 3 by the actuating portion of the chain 30 sliding over the chain slide 118. Pins 60 in pin bars 61, 62 and 63 are in the out position while the pins 60 in the pin bar 64 are retracted. Film feed cam 100 has actuated film feed cam switch 106 supplying air pressure to pistons 135 and 141 thereby rotating the film feed assembly counterclockwise to a position adjacent the incoming cloth 1 where approximately ¼″ of PVC film, advanced by the action of pawl and ratchet assembly 139, 140, is blown under the upper platen by air jets 142 in a position to be sealed to the diaper material. At this time the swing arms are oscillating in the clockwise direction as indicated by the arrow in FIGURE 13 and the diaper material is held between pins 60 in pin bars 61, 62 and 63.

When the swing arm assembly and the rotor-cage assembly rotate 5° clockwise from point A to the position indicated by reference numeral 170, seal pressure cam on the shaft 26 actuates seal pressure cam switch 107 to energize the solenoid operated four way pneumatic valve 130 to supply air pressure to pistons 120 causing the upper platen to lower to the position indicated in FIGURES 6 and 14 where contact is made with the lower platen 52 whereby heat and pressure are applied to the PVC film and diaper material therebetween. As indicated in FIGURE 12, the sealing operation will continue for a period equivalent to a 50° rotation of the rotor-cage assembly 3.

When the swing arm and rotor-cage assembly has rotated 10° clockwise from 170 to a position indicated by 171, the PVC film has been softened by the heat supplied from the Calrod 129 so that film feed cam 100 allows cam switch 106 to deactivate thereby allowing the air to exhaust from piston 141 and also allowing air to exhaust from the upper portion of piston 135 but simultaneously putting air pressure on the bottom of piston 135 causing the film feed assembly attached to support plate 133 to rotate clockwise away from the upper platen assembly 13. Rotation of the film feed assembly away from the upper platen assembly causes the softened PVC film to tear away from the PVC film being sealed to the diaper material. Exhausting of the air from piston 141 allows spring 141a to rotate plate 136 clockwise moving pawl 140 up one notch on the ratchet 139 to the cocked position.

FIGURE 14 indicates the position indicated by the reference letter B in FIGURE 12. This position is when the rotor-cage assembly has rotated about 30° clockwise from point A. As indicated and described the film feed assembly has rotated clockwise away from the upper platen assembly 13 and the upper platen assembly 13 is still in the heat sealing position.

When the swing arm assembly and the rotor-cage assembly rotate to the position 172 which is about 50° clockwise from position 170, seal pressure cam 101 on shaft 26 allows seal pressure cam switch 107 to de-energize the solenoid actuated four way pneumatic valve 130 which causes the pneumatic actuated pistons 120 to raise the upper platen assembly 13 away from the lower platen 52 thereby removing the Calrod heater away from the completed seal on the diaper material 1.

At point 173, which is approximately 60° clockwise from point A, the swing arm 27 has reached the end of synchronization with the rotor-cage assembly 3 and at approximately the same time has reached the end of the clockwise movement. At this point the chain 30 will stop and reverse the movement of the swing arms 27 to return the swing arms in the counterclockwise direction on the return stroke to prepare for another sealing cycle while the rotor-cage assembly 3 continues to rotate in the clockwise direction. When the swing arms 27 have returned about 40° counterclockwise from the reference point 173, the film feed cam 100 actuates the film feed switch 106 to actuate the pneumatic air valve for the pistons 135 and 141 to rotate the film feed assembly on plate 133 counterclockwise into position adjacent the upper platen assembly 13 and rotates plate 136 counterclockwise so that the pawl, which was previously cocked, will rotate shaft 137 through ratchet 139 to advance the PVC film F a pre-determined amount in preparation for sealing another section of diaper material.

In the meantime, the rotor-cage assembly 3 continues to rotate in the clockwise direction from point 173. During the 30° clockwise rotation from point 173 the cage advance and retard follower 89 is riding up the cam surface of the cage advance and repositioning cam 82 to cause the end support discs 57 and associated structure through bell crank 80 and pin members 69 to rotate clockwise with respect to platen member 70 in order to place the blade 54 under the center of the previously completed PVC seal on the diaper material as shown in FIGURE 16. It should be noted in FIGURES 15 and 16 that the swing arms 27, are still on the return stroke, as indicated by the arrows.

As previously described the blade 14 is mounted on an angle of approximately 2° from the axis of rotation of the rotor-cage assembly 3. Therefore, starting at point D and continuing to point E 10° clockwise from point D the co-action of the blades 54 and 14 severs the diaper material at the center of the previously formed PVC seal.

Almost immediately after rotating clockwise beyond point E the cage advance and repositioning follower 89 rides down the cam surface of cam 82 to rotate the end support discs 57 and associated support structure through bell crank 80 and pin member 69 back into the sealing position so that lower platen 53 will be in proper relation to the upper platen assembly 13 to provide another seal on the diaper material 1.

Also during the next 30° rotation of the rotor-cage assembly 3 from the point E to the point 174 the pin load and unload cams 83 and 84 cause followers 90 and 94, respectively, to retract the pins in pin bars 62 and 63 in order to doff the severed sealed diaper 174 onto the conveyor 15.

As pointed out previously the herein disclosed apparatus provides two diapers for each complete rotation of the rotor-cage assembly 3 so that when pins 60 on pin bars 62 and 63 have just about completed the doffing of the completed diaper the pin bars 61 and 64, lower platen 53, and blade 55 are moving into sealing and cutting position adjacent the upper platen assembly 13 and the above-described operation repeats itself.

Pin load and unload cams 83 and 84 are so designed and related to the pin bars 61–64 that when either pin bar 63 or 64 passes from point E to point 174 the corresponding pin bar 63 or 61 passing from points 175 to 176 will have the pins therein retracted along with the pins 60 in the respective pin bar 62 or 64 in order to doff the completed diaper. All pins 60 in all the pin bars are placed into operative position by the cams 83 and 84 as respective pin bar passes through the zone between the reference point 177 and the reference point A. This means that the pins in the pin bars 62 and 64 are retracted from point 174 until they are rotated from point 174 to a position between point 177 and point A while the pins 60 in the pin bars 61 and 63 are retracted only from reference point 176 until they are rotated to a position between reference point 177 and the reference point A. This unusual control of the pins in the pin bars in conjunction with the synchronization of the swing arms 27 with the rotor-cage assembly provides a method and apparatus which continuously provides a supply of diapers and at the same time provides complete control over the material being sealed.

The herein disclosed invention provides continuously a product from a roll of textile material which has the cut edges automatically sealed with a thermoplastic type selvage to prevent unraveling of the cloth. Furthermore, the invention provides a thermoplastic type selvage which is applied in a film form, by a new and improved film feeding arrangement, thereby allowing continuous operation of the machine resulting in increased production rates. The herein disclosed invention also includes a novel arrangement to synchronize the oscillating motion of one member with the rotary motion of another. Furthermore, a novel control device is provided which automatically varies the speed of the supply material so as to produce a constant tension in said material while it is being drawn into the sealing-cutting operation. This control incorporates a delay mechanism which allows minor variations in the material feed without constantly changing the feed drive control. A novel cloth advancing registry system is also provided that is far more exact than seen heretofore when handling sleezy-stretchy material like gauze or Birdseye diaper cloth. Also, a novel cutting blade arrangement is provided to clearly and evenly sever the processed textile material at the center of the thermoplastic seal to provide two edges which have a thermoplastic type selvage to prevent unraveling. A still further feature of the invention is a seam detecting or flaw detecting control which prevents the action of the heat applying platen if the seam or flaw detected will be contacted by the platen during the sealing operation.

Although the preferred embodiment of the invention has been described in detail, it is contemplated that many changes may be made without departing from the scope or spirit of the invention and it is desired to be limited only by the claims.

That which is claimed is:

1. Fabric handling apparatus comprising: a fabric handling machine, means supplying a sheet of fabric to said machine, drive means operably associated with said fabric supply means, means forming a loop in said fabric between said fabric supply means and said machine, and means operably associated with said loop to increase the speed of said drive means when the depth of said loop decreases and to decrease the speed of said drive means when the depth of said loop decreases, said means operably associated with said loop including a roll means in contact with said loop and mounting means supporting said roll means to allow movement of said roll means as the depth of said loop increases or decreases, said means operably associated with said loop further including a cam and follower means operably associated with said mounting means and said drive means to control said drive means in response to the movement of said roll and mounting means, said drive means including a speed variator and a means to vary the voltage to said speed variator, said means to vary the voltage including a potentiometer, said follower means varying the setting of said potentiometer in response to the position of said cam means.

2. Fabric handling apparatus comprising: a fabric handling machine, means supplying a sheet of fabric to said machine, drive means operably associated with said fabric supply means, means forming a loop in said fabric between said fabric supply means and said machine, and means operably associated with said loop to increase the speed of said drive means when the depth of said loop decreases, and to decrease the speed of said drive means when the depth of said loop increases, said means operably associated with said loop including a roll means in contact with said loop, and mounting means pivotally supporting said roll means to allow movement of said roll means as the depth of said loop increases and decreases, said means operably associated with said loop including a cam and follower means operably associated with said mounting means and said drive means to control said drive means in response to the pivotal movement of said roll and mounting means, said cam means being connected to said mounting means and pivoting therewith, said cam means having at least one dwell surface to allow minor changes in the depth of said loop without changing the speed of said drive means.

3. Fabric handling apparatus comprising: a fabric handling machine, means supplying a sheet of fabric to said machine, drive means operably associated with said fabric supply means, means forming a loop in said fabric between said fabric supply means and said machine, and means operably associated with said loop to increase the speed of said drive means when the depth of said loop decreases and to decrease the speed of said drive means when the depth of said loop increases, said means operably associated with said loop including a roll means in contact with said loop, and mounting means pivotally supporting said roll means to allow movement of said roll means as the depth of said loop increases and decreases, said means operably associated with said loop including a cam and follower means operably associated with said mounting means and said drive means to control said drive means in response to the pivotal movement of said roll and mounting means, said cam means being connected to said mounting means and pivoting therewith, said cam means having at least two dwell surfaces thereon to allow minor changes in the depth of said loop without changing the speed of said means.

4. Fabric handling apparatus comprising: a fabric handling machine, means supplying a sheet of fabric to said machine, drive means operably associated with said fabric supply means, means forming a loop in said fabric between said fabric supply means and said machine, and means operably associated with said loop to increase the speed of said drive means when the depth of said loop decreases and to decrease the speed of said drive means when the depth of said loop increases, said means operably associated with said loop including a roll means in contact with said loop, and mounting means pivotally supporting said roll means to allow movement of said roll means as the depth of said loop increases and decreases, said means operably associated with said loop including a cam and follower means operably associated with said mounting means and said drive means to control said drive means in response to the pivotal movement of said roll and mounting means, said cam means being connected to said mounting means and pivoting therewith, said drive means including a speed variator and means to vary the voltage to said speed variator including a potentiometer, said follower means varying the setting of said potentiometer in response to the position of said cam means.

References Cited

UNITED STATES PATENTS

| | | | |
|---|---|---|---|
| 1,654,723 | 1/1928 | De Ybarrondo | 226—42 |
| 3,201,057 | 8/1965 | Ryan | 242—57 X |
| 3,225,989 | 12/1965 | Stine | 226—44 |

FOREIGN PATENTS 1,041,317  10/1956  Germany.

ALLEN N. KNOWLES, *Primary Examiner.*